United States Patent
Nealis et al.

(10) Patent No.: US 9,246,524 B2
(45) Date of Patent: Jan. 26, 2016

(54) OUTDOOR COUPLER UNIT UTILIZING CIRCULATOR NETWORK

(71) Applicant: ZTE (USA), Inc., Richardson, TX (US)

(72) Inventors: Edwin Nealis, Cary, NC (US); Ying Shen, Chapel Hill, NC (US)

(73) Assignee: ZTE (USA) INC., Austin, TX (US)

( * ) Notice: Subject to any disclaimer, the term of this patent is extended or adjusted under 35 U.S.C. 154(b) by 22 days.

(21) Appl. No.: 14/325,222

(22) Filed: Jul. 7, 2014

(65) Prior Publication Data
US 2015/0065184 A1 Mar. 5, 2015

Related U.S. Application Data

(60) Provisional application No. 61/874,275, filed on Sep. 5, 2013.

(51) Int. Cl.
| H04B 7/00 | (2006.01) |
| H04B 1/04 | (2006.01) |
| H04B 10/90 | (2013.01) |
| H01P 1/213 | (2006.01) |
| H01P 5/12 | (2006.01) |
| H04B 1/52 | (2015.01) |

(52) U.S. Cl.
CPC .......... *H04B 1/0475* (2013.01); *H01P 1/213* (2013.01); *H01P 5/12* (2013.01); *H04B 1/52* (2013.01); *H04B 10/90* (2013.01)

(58) Field of Classification Search
None
See application file for complete search history.

(56) References Cited

U.S. PATENT DOCUMENTS

| 3,032,723 A | 5/1962 | Ring |
| 4,761,821 A * | 8/1988 | Mawhinney ............. H04B 1/50 455/103 |
| 5,815,803 A | 9/1998 | Ho et al. |
| 5,978,662 A * | 11/1999 | Swales .................... H03D 7/168 455/119 |
| 7,982,664 B1* | 7/2011 | Uscinowicz .......... G01S 7/4004 342/165 |
| 2002/0144392 A1 | 10/2002 | John et al. |
| 2005/0042989 A1* | 2/2005 | Ho ....................... H04B 1/0458 455/78 |
| 2006/0234627 A1 | 10/2006 | Cartin et al. |
| 2007/0225033 A1* | 9/2007 | Yoon .................... H01Q 1/2216 455/552.1 |
| 2008/0037507 A1* | 2/2008 | Fukumoto ................. H04B 1/18 370/312 |
| 2009/0128153 A1* | 5/2009 | Graesslin ........... G01R 33/3607 324/322 |
| 2011/0053646 A1* | 3/2011 | Kundmann ............ H01Q 3/267 455/562.1 |
| 2011/0117862 A1* | 5/2011 | Bagger ................. H04B 1/0057 455/77 |
| 2011/0243043 A1 | 10/2011 | Jackson et al. |
| 2011/0243562 A1 | 10/2011 | Jackson et al. |
| 2013/0021955 A1* | 1/2013 | Duron ................... H04B 1/0475 370/297 |
| 2013/0077551 A1* | 3/2013 | Lo ........................ H04W 16/14 370/312 |
| 2013/0130619 A1* | 5/2013 | Harverson .............. H03F 3/602 455/11.1 |

FOREIGN PATENT DOCUMENTS

JP S55132103 A 10/1980

OTHER PUBLICATIONS

ZTE USA, Inc., Extended European Search Report EP14181933.4, 17FEB2015, 7 pgs.

* cited by examiner

*Primary Examiner* — Dominic E Rego
(74) *Attorney, Agent, or Firm* — Morgan, Lewis & Bockius LLP

(57) ABSTRACT

An Outdoor Coupler Unit (OCU) is described to combine or split, transmit and receive microwave signals from multiple Outdoor Units (ODUs). The OCU has low signal loss by utilizing circulators. The OCU concept allows for system expansion beyond two ODUs if desired, and can be placed outdoors in close proximity to an antenna or antennas.

12 Claims, 17 Drawing Sheets

OUTDOOR COUPLER UNIT UTILIZING CIRCULATOR NETWORK

RELATED APPLICATION

The present application claims priority to U.S. Provisional Application No. 61/874,275, "OUTDOOR COUPLER UNIT UTILIZING CIRCULATOR NETWORK," filed on Sep. 5, 2013, which is hereby incorporated by reference in its entirety.

TECHNICAL FIELD

The present invention relates to the equipment used for microwave radio communication, and in particular, to an Outdoor Coupler Unit (OCU) device that allows for low loss combining and splitting of transmit and receive signals to and from antennas and digital communications networks.

BACKGROUND

Microwave communication systems commonly consist of an Outdoor Unit (ODU) connected to a microwave antenna. The microwave antenna is pointed at another microwave antenna with another ODU connected to it. The pair of ODUs and associated antennas comprise a link. The ODU typically contains a transmitter and a receiver to transmit and receive data to and from another ODU through the antennas, the client's network.

Commonly, two ODUs are connected to a single antenna through a hybrid coupler. The hybrid coupler adds significant loss to the transmit and receive signals of the ODU, reducing the system gain. This loss is undesirable since the system gain determines the distance that can be spanned between antennas in a link. A greater loss translates to increased cost in purchasing and maintaining a greater number of antennas in a linked network. Another limitation of the hybrid coupler is that only two ODUs can be connected to it. If one ODU fails in such a system, the effect on network traffic can be substantial. In addition, the limited isolation between ODUs through the hybrid coupler can cause interference.

SUMMARY

The Outdoor Coupler Unit (OCU) consists of circulators which combine the transmit and receive signals of multiple ODUs. The circulators can potentially be coaxial or waveguide circulators, and the circulators can be coupled with each other using a medium such as coaxial cable or waveguide. Coaxial circulators offer lower loss transfer of signal power than hybrid couplers, and integrated waveguide circulators further reduce the signal loss.

In some embodiments, more than one ODU is connected to an antenna in order to increase the data throughput of the link or to provide protection against hardware failure or airpath degradation. Additional ODUs can utilize techniques such as space diversity or cross polar interference cancellation to make greater use of a given antenna's bandwidth. Additional antennas can be installed in a given system rather than connecting multiple ODUs to a single antenna, but the cost can be prohibitive.

The OCU can be designed to support more than two ODUs, increasing the stability and reliability of the radio communication system. The OCU can also be designed for future expansion by adding RX and TX expansion ports, and coupling a second OCU in tandem if necessary. The OCU can be designed for use with one or more antennas. Some exemplary radio communication systems include one OCU coupled with two ODUs, one OCU coupled with four ODUs and two OCUs coupled with eight ODUs. The ODUs can be coupled to circulators within the OCU in a variety of configurations, depending on how many antennas are in the system, what each antenna is allocated for, and whether or not expansion ports are being used.

The advantages of designing the OCU for outdoor use include that it can be placed much closer to an antenna than an indoor device, and in some instances, right on the antenna itself. The close proximity of the OCU to the antenna allows for a short connection between the OCU and the antenna and reduces RF loss. Indoor systems occupy more space than the OCU, which results in increased costs for buying or renting space for the radio communication system. The OCU can also avoid the need for refrigeration or artificial cooling systems, as it is ventilated by virtue of being located outdoors. Moreover, since the OCU only comprises passive components and no frequency-specific filters, taking one ODU offline for replacement or maintenance does not require shutting down the OCU. The remaining ODU or ODUs can continue to operate and therefore avoid a complete shutdown of network traffic at this link. The OCU is designed to withstand the various environmental stressors such as wind, rain, snow, humidity and high or low temperatures.

BRIEF DESCRIPTION OF DRAWINGS

The accompanying drawings, which are included to provide a further understanding of the invention and are incorporated herein and constitute a part of the specification, illustrate embodiments of the invention and together with the description serve to explain the principles of the invention. Like reference numerals refer to corresponding parts throughout the several views of the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on many types of radio communication systems.

Figure 1A:
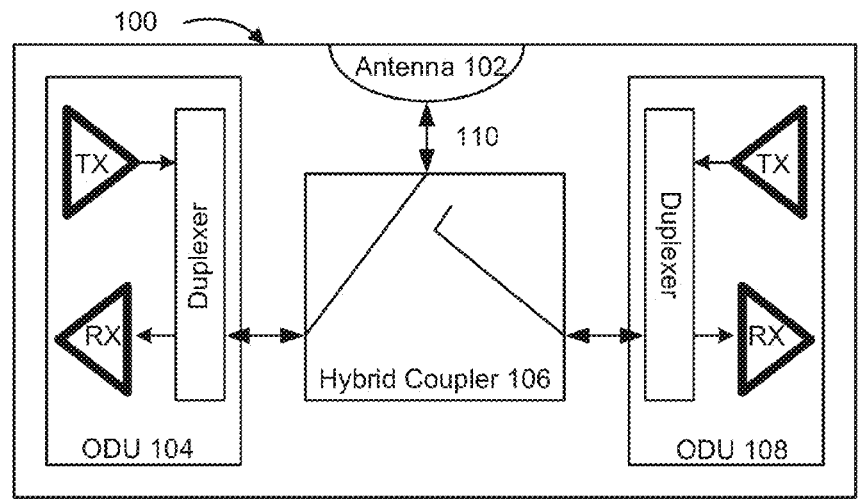
FIG. 1A is a schematic diagram of an existing radio communication system utilizing two ODUs and a hybrid coupler.

FIG. 1A is a schematic diagram of an existing microwave radio communication system 100 including two ODUs (outdoor units) 104 and 108 attached to a hybrid coupler 106, connected to an antenna 102 using a flexible waveguide 110. Hybrid couplers 106 are utilized in microwave radio communication systems to split received signals and combine transmit signals. Hybrid couplers 106 are either balanced or unbalanced. A balanced hybrid coupler divides the signal into two signals of similar power. An unbalanced hybrid coupler divides the signal into two signals of different power. The loss to each ODU TX and RX signal due to a balanced hybrid coupler is typically 3.5-4 dB. The loss due to an unbalanced hybrid coupler is typically 1.5 to 2 dB for one ODU and 6.5 to 7.0 dB for the other ODU. In some embodiments the hybrid coupler 106 and its pair of ODUs 104 and 108 are attached to antenna 102, shortening the length of flexible waveguide 110.

In some embodiments of the existing radio communication system 100, either ODU 104 or ODU 108 may operate as a backup system. Each ODU in this system contains a transmitter and a receiver connected to a duplexer. Hybrid couplers are designed to support two ODUs. The limitations of system 100 are that hybrid couplers are relatively lossy compared to circulator-based systems, and that a hybrid coupler can only be used to support two ODUs.

Figure 1B:
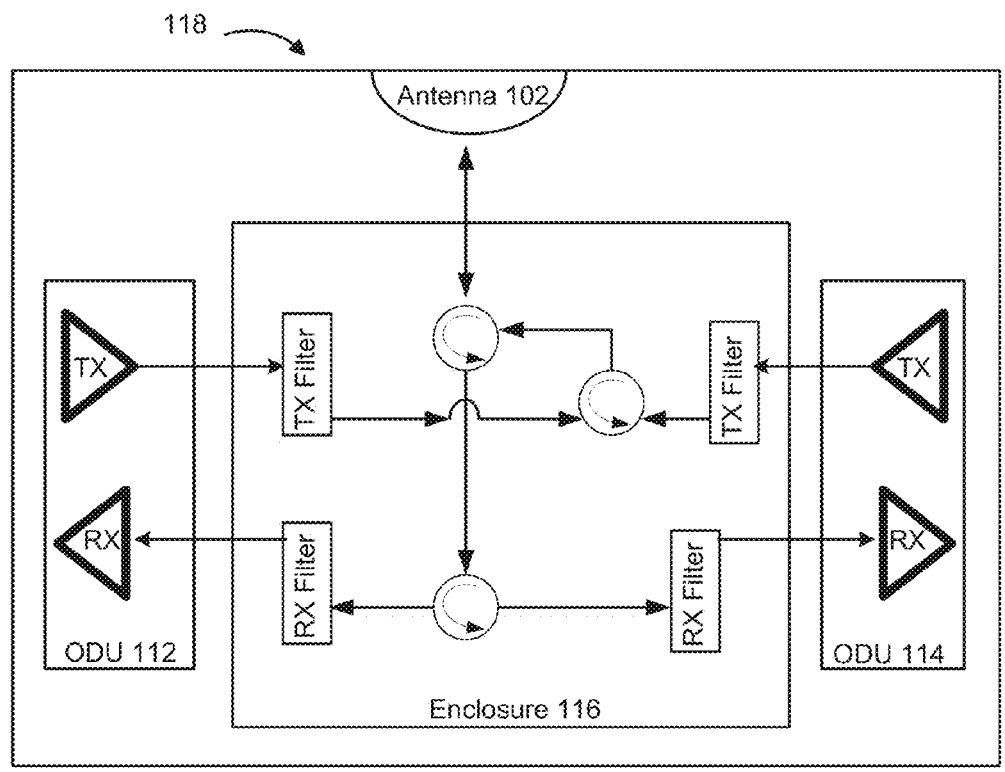
FIG. 1B is a schematic diagram of an existing radio communication system utilizing two ODUs and an intermediary enclosure.

FIG. 1B is a schematic diagram of another existing radio communication system 118 utilizing two ODUs 112 and 114, and an intermediary enclosure 116 coupled with an antenna 102. In this system, the ODUs 112 and 114 do not contain filters or duplexers. The intermediary enclosure 116 comprises a plurality of TX and RX filters, as well as a plurality of circulators. The limitation with this system is that the intermediary enclosure is built to be channel-specific, as it contains a plurality of TX and RX filters each tuned to a particular frequency channel (or sub-band). In this system, if it becomes necessary to change the channels of system 118, the intermediary enclosure 116 would have to be shut down and disassembled to swap out the filters. Since the intermediary enclosure 116 contains all the channel filters, the client must know all the desired channels prior to assembling the enclosure. This is problematic since a client may obtain a license to operate in a particular frequency band ahead of assembling the radio communication system 118, but may not know which frequency channels they wish to use until a later time. A frequency band comprises many frequency channels, and there are tradeoffs to using particular channels in a given system.

Figure 2:
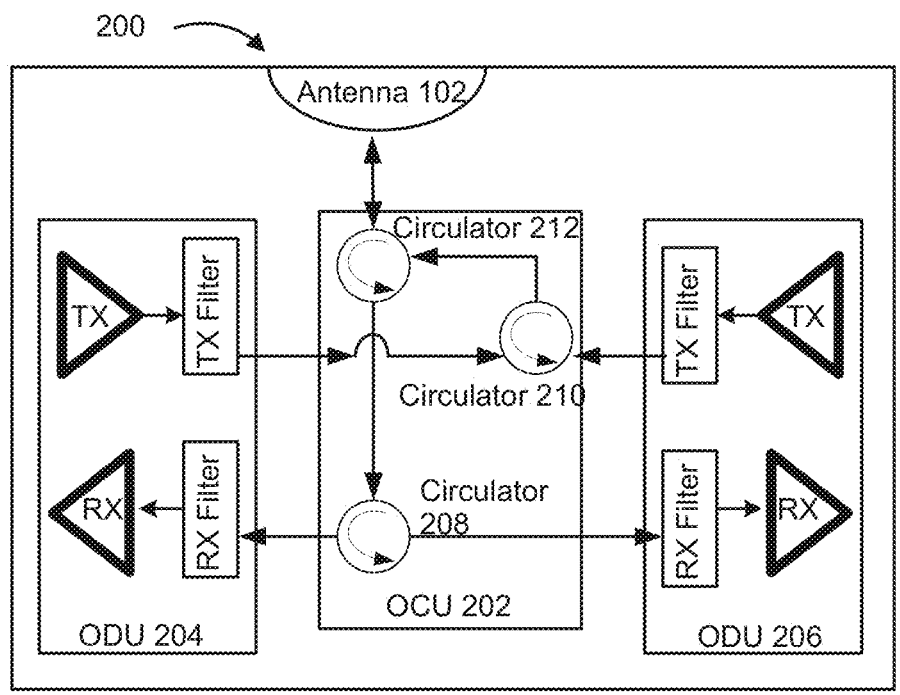
FIG. 2 is a schematic diagram of an exemplary radio communication system using two ODUs and an OCU.

FIG. 2 is a schematic diagram of an exemplary radio communication system 200 using two ODUs 204 and 206 and an OCU (outdoor coupler unit) 202, coupled with an antenna 102. In some embodiments, the OCU 202, along with ODUs 204 and 206 are coupled directly to the antenna 102. In some embodiments, the OCU 202, along with the ODUs 204 and 206 are located a distance away from the antenna and coupled with the antenna by a waveguide. Unlike indoor units designed for similar functions, OCU 202 is specially designed to withstand environmental stress from being placed outdoors, such as rain, wind, snow, humidity and high or low temperatures. Due to the ruggedness of its design, OCU 202 can be located at or very close to its corresponding antenna or antennas. This allows for a shorter communicative link between the antenna or antennas, and the OCU 202, resulting in less signal degradation.

It should be noted that in case a channel needs to be changed in system 200, one ODU can be taken offline and OCU 202 can continue to operate with the other ODU still operating. This allows for routine maintenance to be performed with much less interference to network traffic than if OCU 202 had to be shut down. OCU 202 comprises passive elements, allowing for an energy and space efficient design.

In some embodiments, ODU 204 and ODU 206 each comprise a transmitter, a receiver, a transmit filter and a receive filter. The transmit filters and receive filters are specially tuned to correspond to a particular frequency channel. OCU 202 is a compact module comprising 3 circulators 208, 210 and 212 and a plurality of wave-transfer media to connect the circulators with each other as well as antenna 102 and ODU 204 and ODU 206. OCU 202 can be utilized for a wide range of frequencies. In some embodiments, OCU 202 may be customized to correspond to a particular frequency band, where a given frequency band comprises a plurality of frequency channels.

OCU 202 works to efficiently combine, split, transmit and receive signals in close proximity to antenna 102. Circulators are passive components tuned to receive signals through a first port and transmit the received signal out of a second port. 3-port circulators receive a signal through a first port, transmit the signal through a second port, receive a different signal through the second port and transmit the different signal through a third port. Similarly, a signal received through the third port would be transmitted out the first port. In some embodiments, circulator 208, circulator 210 and circulator 212 are 3-port circulators.

When OCU 202 is receiving a first RX signal from antenna 102, the first RX signal is received at the first port of circulator 212. The first RX signal is transferred to the second port of circulator 212 where it is transmitted to the first port of circulator 208. At circulator 208, the first RX signal exits out the second port which is electrically coupled with the RX Filter of ODU 204. The RX filter of ODU 204 is designed to allow a particular frequency sub-band/channel of the first RX signal to pass through to the receiver of ODU 204. The remaining component of the first RX signal that does not match the frequency sub-band of the RX filter of ODU 204, reflects back to the second port of circulator 208. From the second port of circulator 208, the reflected portion of the first RX signal is sent through the third port of circulator 208 which is electrically coupled with the RX filter of ODU 206. The RX filter of ODU 206 is designed to receive the remainder of the first signal and pass it to the receiver of ODU 206. In this way, circulator 208 effectively acts to split the first RX signal into component signals for ODU 204 and ODU 206 to respectively receive.

In transmit mode, circulator 210 of OCU 202 receives a first TX signal at the first port of circulator 210 from the TX filter of ODU 204. The first TX signal is then output through the second port of circulator 210. The second port of circulator 210 is electrically coupled with the TX filter of ODU 206. The first TX signal encounters the TX filter of ODU 206 and reflects back to the second port of circulator 210. The second port of circulator 210 also receives a second TX signal from the transmitter in ODU 206, through the TX filter of ODU 206. First TX signal and second TX signal are each component signals comprised of a particular frequency channel that its corresponding TX filter is tuned to. Circulator 210 outputs the first TX signal and the second TX signal through its third port. The third port of circulator 210 is electrically coupled with the third port of circulator 212. Circulator 212 receives the first TX signal and second TX signal and outputs them through its first port, which is electrically coupled with antenna 102. In this way, circulator 210 effectively acts to combine two component TX signals, and circulator 212 acts as an isolator to transmit signals to antenna 102, and receive signals from antenna 102.

Figure 3:
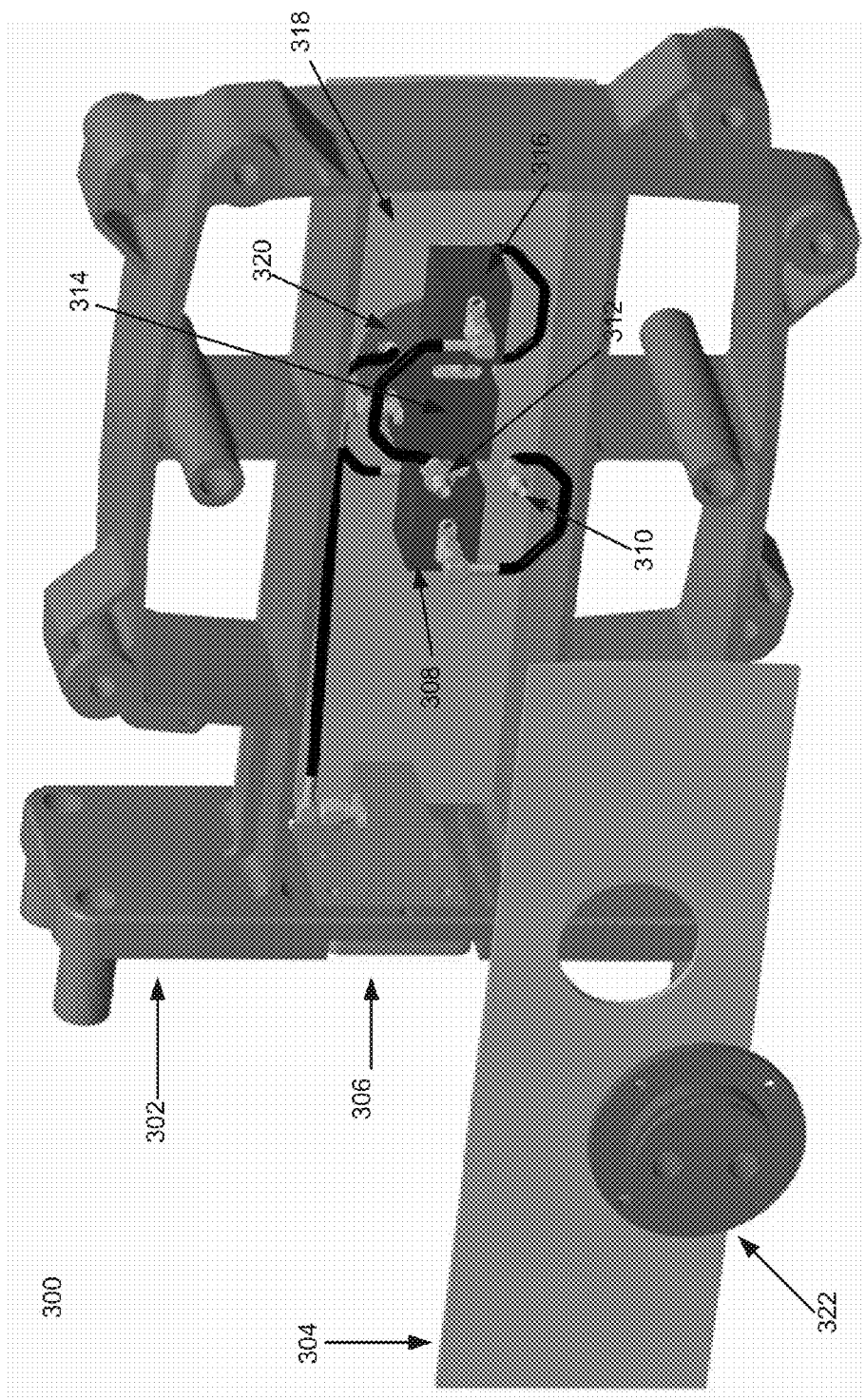
FIG. 3 is a representation of an exemplary OCU to support two ODUs, comprising coaxial cables and coaxial circulators.

FIG. 3 is a representation of an exemplary OCU 300 to support two ODUs, comprising coaxial cables and coaxial circulators. It should be understood that FIG. 3 is only one possible structural representation of a coaxial-based OCU that can support two ODUs. For example, OCU 300 could be in the shape of a cube, or another multi-sided prism.

OCU 300 utilizes coaxial cables to connect the three coaxial circulators 308, 314 and 316 inside. OCU 300 comprises a circulator support structure 302. Circulator support structure 302 can be formed in several different ways to accomplish the task of housing the circulators and coaxial cables, such as a solid plate, a frame or a box. OCU 300 further comprises a first plate 304 and a second plate 318 to protect the portion of circulator support structure 302 that houses the circulators and cables. Port plates 320 and 322 protect and provide access to signal communication ports such as receiver port 312, transmitter port 310 and a corresponding pair of ports on the other side of circulator support structure 302. Port plates 320 and 322 can also be considered ODU-interface modules, since they interface with ODUs that connect with the OCU, using the signal communication ports. The OCU 300 interfaces with an antenna in this embodiment through the antenna interface module 306.

Figure 4:
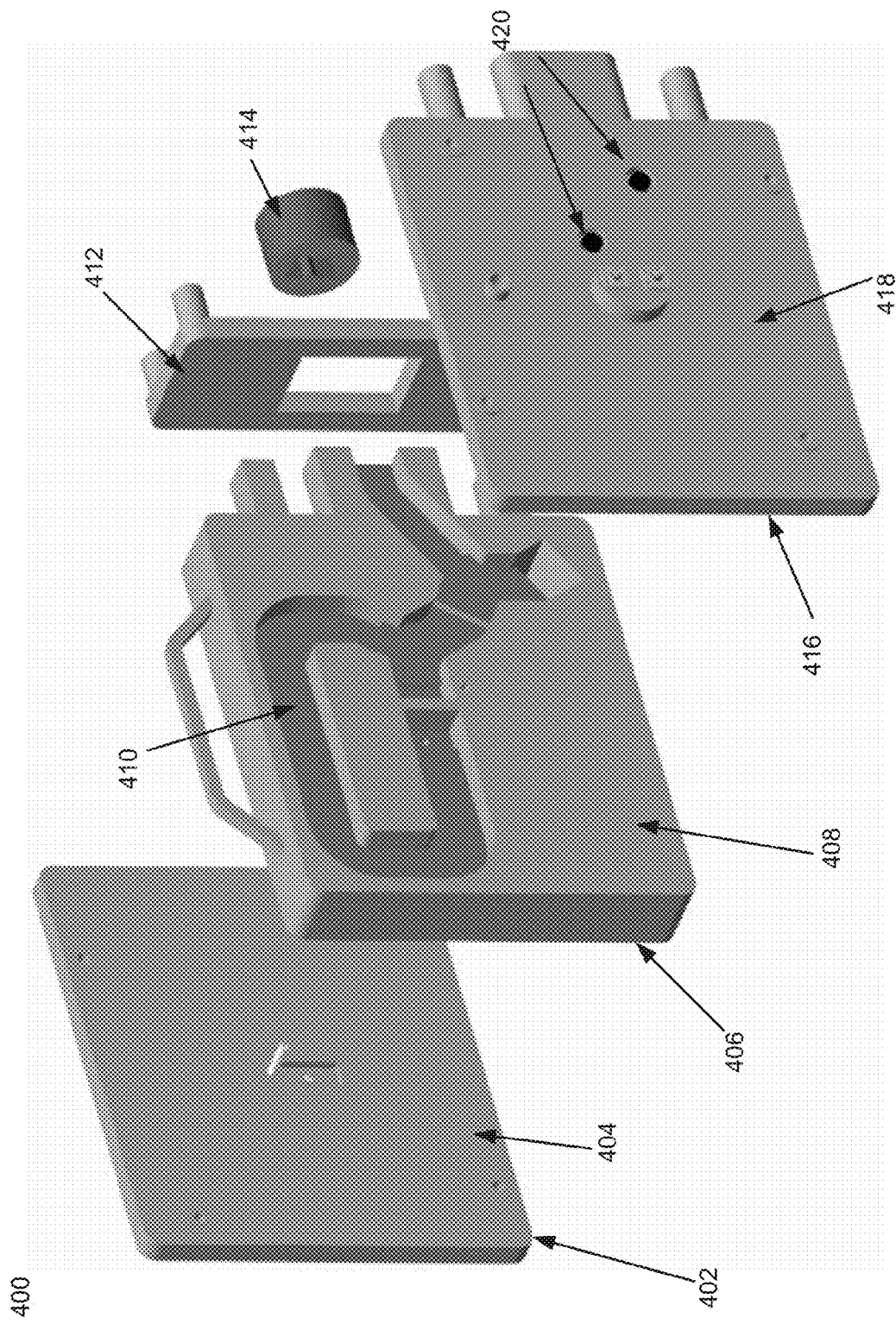
FIG. 4 is a representation of an exemplary OCU to support two ODUs, comprising waveguides and waveguide circulators.

FIG. 4 is a representation of an exemplary OCU 400 designed to support two ODUs, comprising waveguides and waveguide circulators. As mentioned for the coaxial-based OCU, FIG. 4 is representative of one possible structural representation of a waveguide-based OCU that can support two ODUs. For example, OCU 400 could be in the shape of a cube, or another multi-sided prism.

OCU 400 utilizes waveguides such as 410 rather than coaxial cables, to couple the circulators together. In this embodiment, OCU 400 comprises a first plate 402 with a first side and a second side 404. The first side of the first plate 402 has one or more signal communication ports, coupled with one or more signal interface media going through the plate such as coaxial cables, to couple the OCU 400 with one of two ODUs during normal operation. In this embodiment, the first side of first plate 402 has one port for a transmit signal from an ODU, and one port for a receive signal from an ODU. The second side 404 of first plate 402 is capable of connecting with circulator plate 406. OCU 400 also comprises a second plate 416, with a first side 418 and a second side. The second side of the second plate 416 is substantially similar to the second side 404 of the first plate 402, and is also capable of connecting with circulator plate 406. In this exemplary embodiment, the first side 418 of the second plate 416 has one port for a transmit signal from an ODU, and one port for a receive signal from an ODU, each coupled with a signal interface media going through the plate such as a coaxial cable, to a respective location on the waveguides. In some embodiments, the first side 418 of the second plate 416 also has one or more magnets 420 placed in depressions on the first side 418 of the second plate 416. The one or more magnets 420 are aligned with the center of one or more waveguide circulators located in the circulator plate 406. This allows the one or more waveguide circulators to be adjusted by the externally located magnets, when the OCU 400 is fully assembled. The first side of the first plate 402, also comprises one or more magnets 420, in alignment with the center of one or more waveguide circulators located in the circulator plate. In some embodiments, OCU 400 can utilize a combination of waveguides and coaxial cables, as well as waveguide circulators and coaxial circulators. First plate 402 and second plate 416 can also be considered ODU-interface modules, since they interface with ODUs that connect with the OCU, using the signal communication ports.

Circulator plate 406 comprises one or more waveguides, and one or more circulators connected with waveguides. In this embodiment, circulator plate 406 has a first side and a second side 408. One or more waveguide circulators may be placed on the first side or the second side 408 of circulator plate 406. OCU 400 further comprises a mounting plate 412 and an antenna interface module 414.

Figure 5:
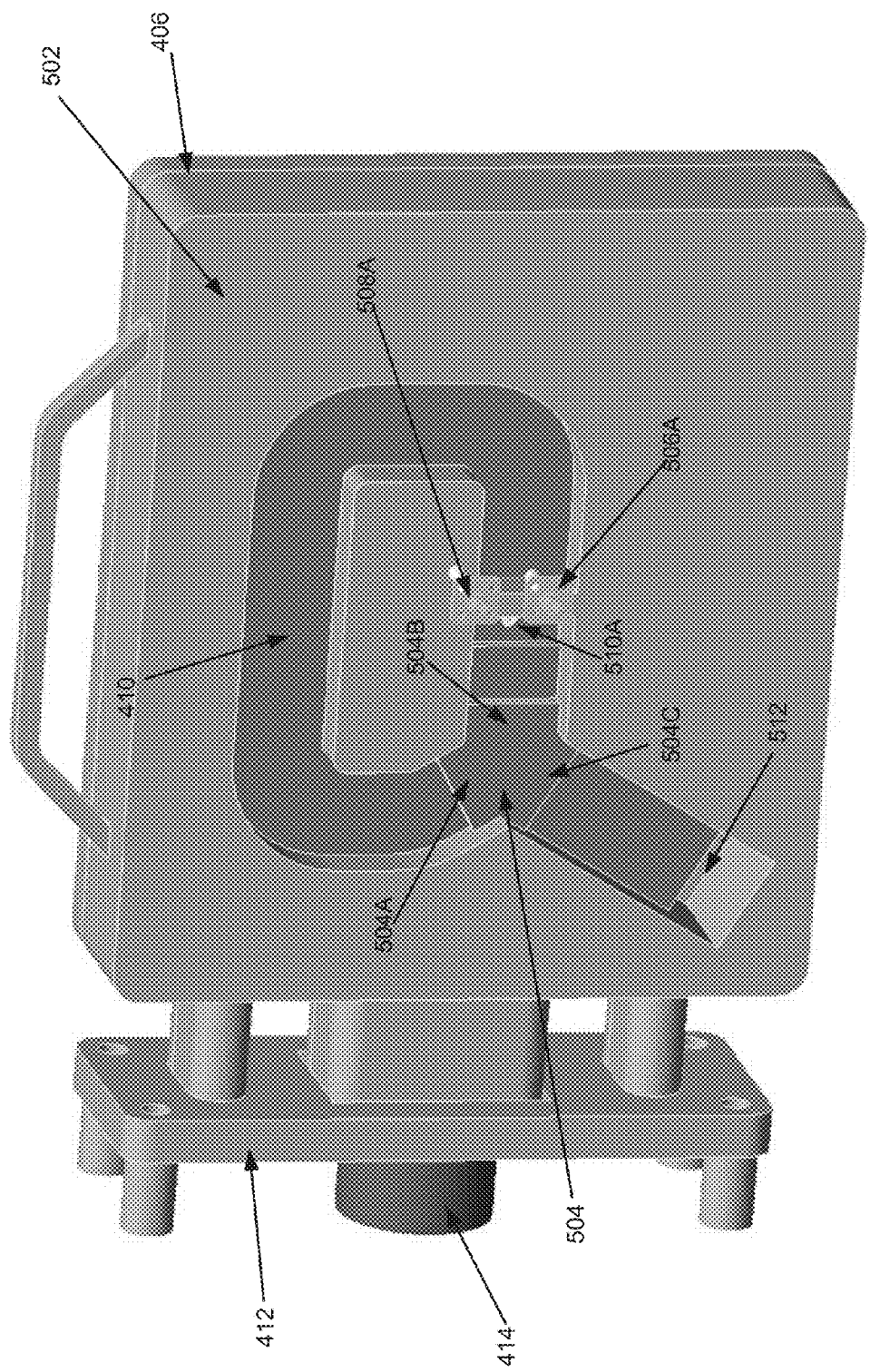
FIG. 5 is a representation of the transmit circulator side of an exemplary circulator plate of an OCU, comprising waveguides and waveguide circulators.

FIG. 5 is a representation of the first side 502 of circulator plate 406 of exemplary OCU 400 from FIG. 4. In this embodiment, the first side 502 of circulator plate 406 may also be referred to as the transmit circulator side 502, since the transmit waveguide circulator 504 is located on this side of circulator plate 406. Waveguide circulator 504 has three ports, 504A, 504B and 504C. Waveguide circulator 504 corresponds to circulator 210 from FIG. 2. Circulator plate 406 has connectors and coax-to-waveguide transitions on each side of the plate 406, to connect TX and RX signals of each ODU to particular waveguide circulators. On this transmit circulator side 502, 506A represents a coax-to-waveguide transition for the TX signal received from the ODU on the first side of the first plate 402 on FIG. 4. Coax-to-waveguide transition 510A comes from the second side 408 of the circulator plate 406, to allow transmission of a TX signal from the ODU on the first side 418 of the second plate 416. 508A is a coax-to-waveguide transition to get a RX signal from receiver waveguide circulator on the second side 408 of the circulator plate 406, for the ODU on the first side of the first plate 402.

In some embodiments, waveguides 410 can be constructed by carving out a channel in circulator plate 406 for each section of waveguide, and placing a cover on top of the carved portion to form a closed, hollow path. In such instances, the cover may be made of any of a variety of materials, such as aluminum, brass, copper, silver or gold. Waveguides 410 can also be flexible tubing formed from a variety of materials. A portion of the waveguide on the transmit circulator side 502 passes through to the other side of circulator plate 406 through opening 512. This portion of waveguide transmits a combined TX signal out of port 504C of waveguide circulator 504. In this embodiment, waveguide circulator 504 gets the signal from coax-to-waveguide transition 506A at circulator port 504A, and the signal from coax-to-waveguide transition 510A at circulator port 504B.

Figure 6:
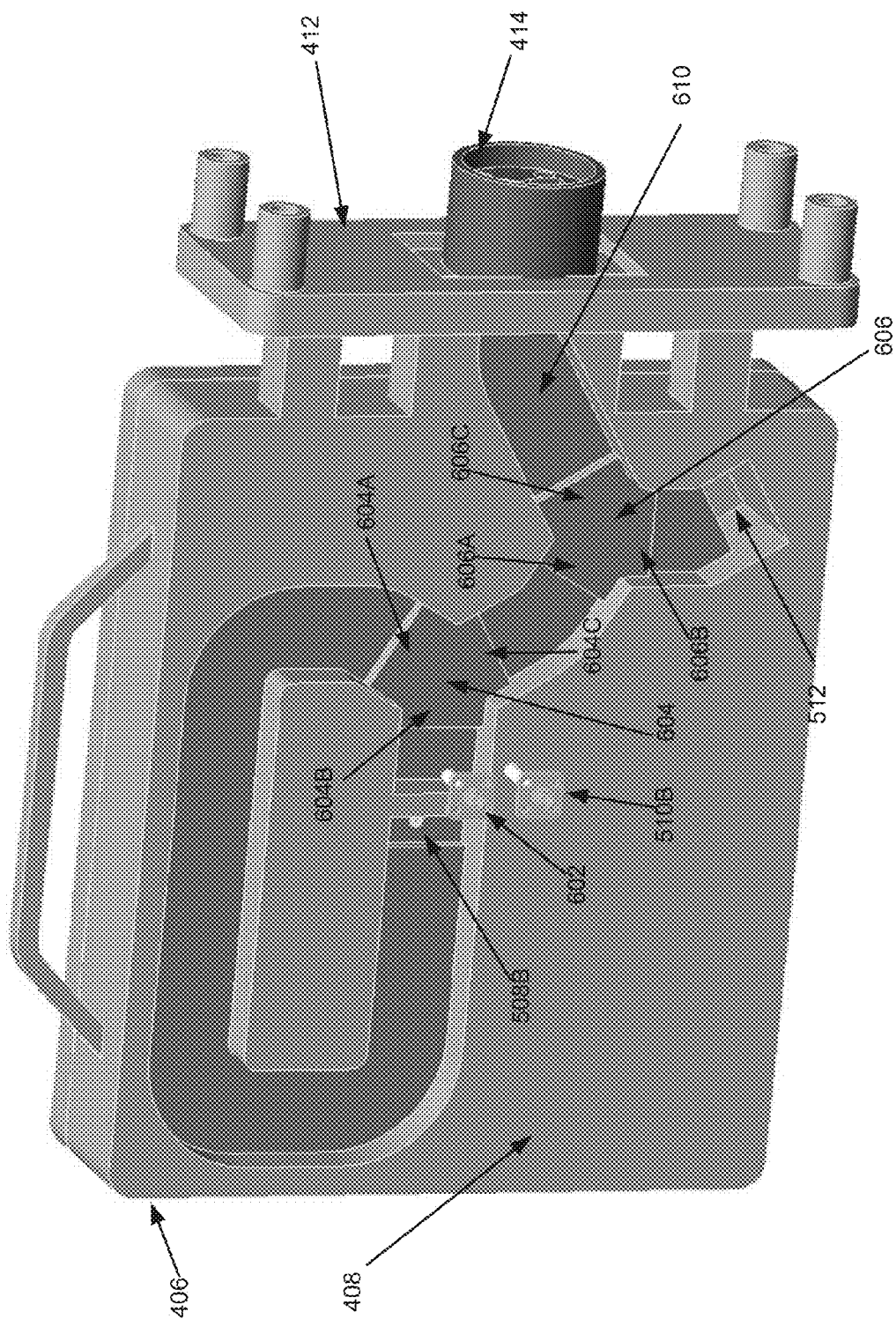
FIG. 6 is a representation of the receive circulator side of an exemplary circulator plate of an OCU, comprising waveguides and waveguide circulators.

FIG. 6 is a representation of the second side 408 of circulator plate 406 of an exemplary OCU 400. In this embodiment, the second side 408 of circulator plate 406 may also be referred to as the receive circulator side 408, since the receive waveguide circulator 604 is located on this side of circulator plate 406. Waveguide circulator 604 has three ports, 604A, 604B and 604C. Waveguide circulator 604 corresponds to circulator 208 from FIG. 2. On this receive circulator side 408, 508B is the coax-to-waveguide transition for the RX signal sent to the ODU on the first side of the first plate 402, through transition 508A. Coax-to-waveguide transition 602 allows a RX signal to be sent to an ODU on the first side 418 of the second plate 416. Transition 510B corresponds to transition 510A on the first side 502 of circulator plate 406.

In this embodiment, waveguide circulator 604 sends a signal through circulator port 604A to transition 508B, sends a signal through circulator port 604B to transition 602, and receives a first RX signal from an antenna through port 604C. In this embodiment, waveguide circulator 606 corresponds to circulator 212 in FIG. 2. Circulator 606 receives a TX signal at port 606B from the waveguide circulator 504 on the first side 502 of circulator plate 406 through opening 512. Circulator 606 outputs a first RX signal through port 606A, and port 606C sends transmit signals to the antenna and receives signals from the antenna over waveguide 610.

Figure 7A:
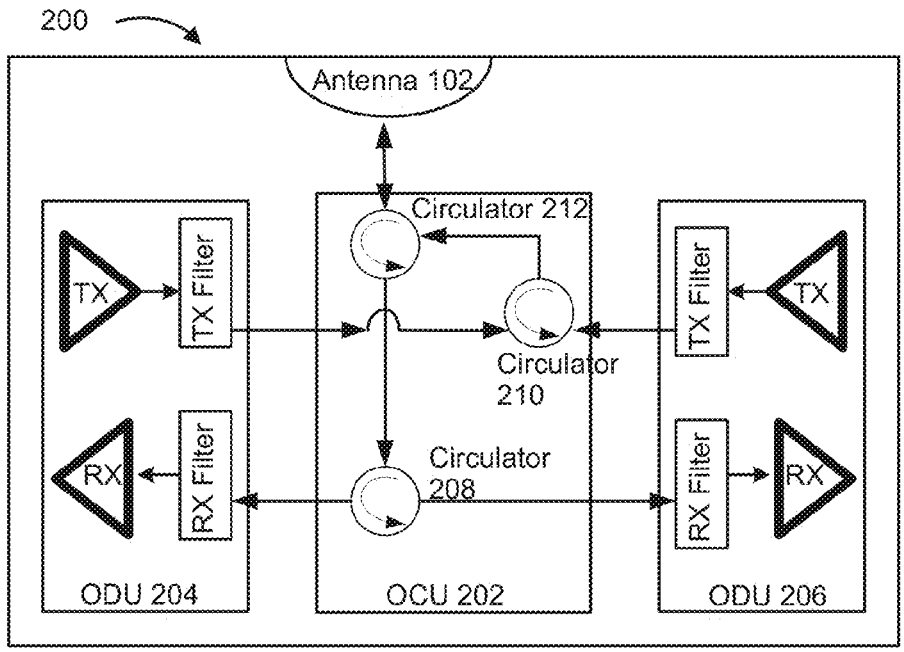
FIG. 7A is a schematic diagram of the exemplary radio communication system using two ODUs and an OCU from FIG. 3.

FIG. 7A is a schematic diagram of the exemplary radio communication system 200 using two ODUs 204 and 206 and OCU 202 from FIG. 2B. This is provided for reference to show the essential logic of using circulators as combiners in some applications, and using circulators as isolators in other applications to achieve the essential function of an OCU, regardless of the number of ODUs in the radio communication system.

Figure 7B:
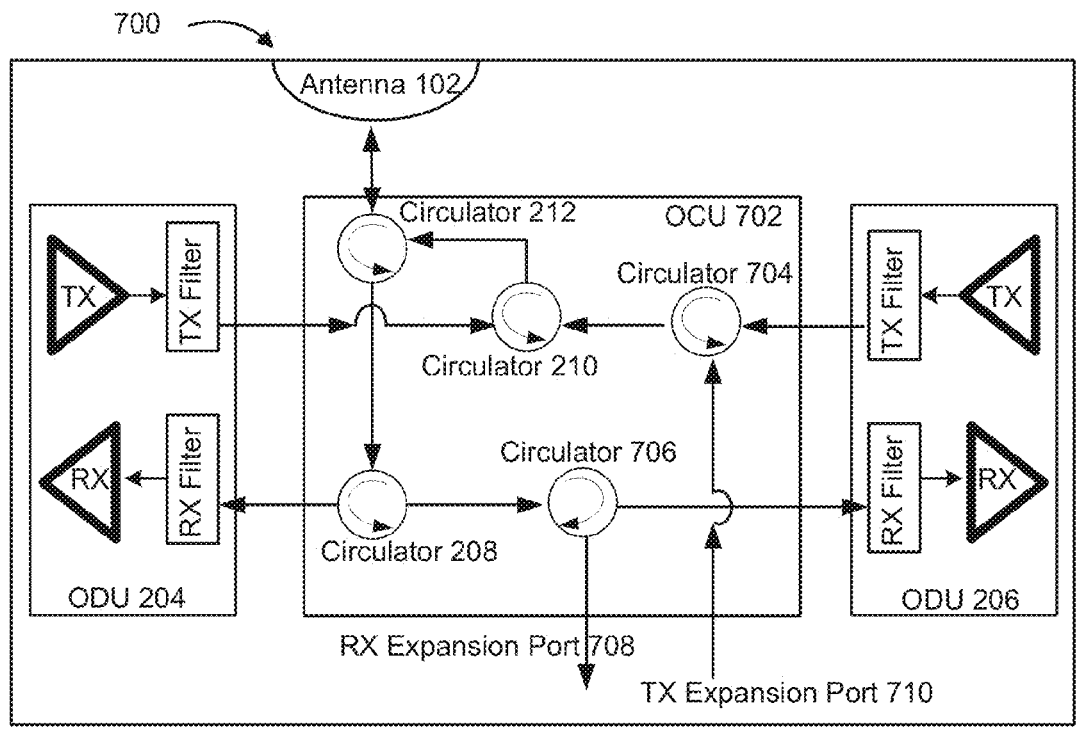
FIG. 7B is a schematic diagram of an exemplary radio communication system using two ODUs and an OCU with an RX expansion port and a TX expansion port.

FIG. 7B is a schematic diagram of an exemplary radio communication system 700 using two ODUs 204 and 206 and an OCU 702 with an RX expansion port 708 and a TX expansion port 710. In this exemplary system, OCU 702 has two additional circulators, circulator 704 and circulator 706, to accommodate an additional receive signal and an additional transmit signal.

In OCU 702, circulator 704 receives a first TX signal from TX expansion port 710 at its first port. Circulator 704 receives a second TX signal from ODU 206 at its second port, along with a reflected version of the first TX signal. The first TX signal and the second TX signal are both output from the third port of circulator 704 and sent to the first port of circulator 210 where a third TX signal from ODU 204 is merged with them. At circulator 208, a first RX signal is received at a first port of circulator 208, and a first component of the first RX signal is received by ODU 204 through the second port of the circulator. The remainder of the first RX signal is output through the third port of circulator 208 and sent to the first port of circulator 706. From circulator 706, a second component of the first RX signal is received by ODU 206 through the second port of the circulator, and the remaining component of the first RX signal is output through the third port of circulator 706 to be propagated through RX expansion port 708. The remainder of system 700 operates substantially similarly to system 200.

The addition of a RX expansion port 708 and a TX expansion port 710 to OCU 702 allows for a system comprising additional ODUs and additional OCUs. This principle applies to other embodiments of an OCU as well. In case there is no need to use the expansion ports on an OCU, loads can be placed at the ports to allow for efficient wave reflection of any potential signals sent to the ports.

Figure 8:
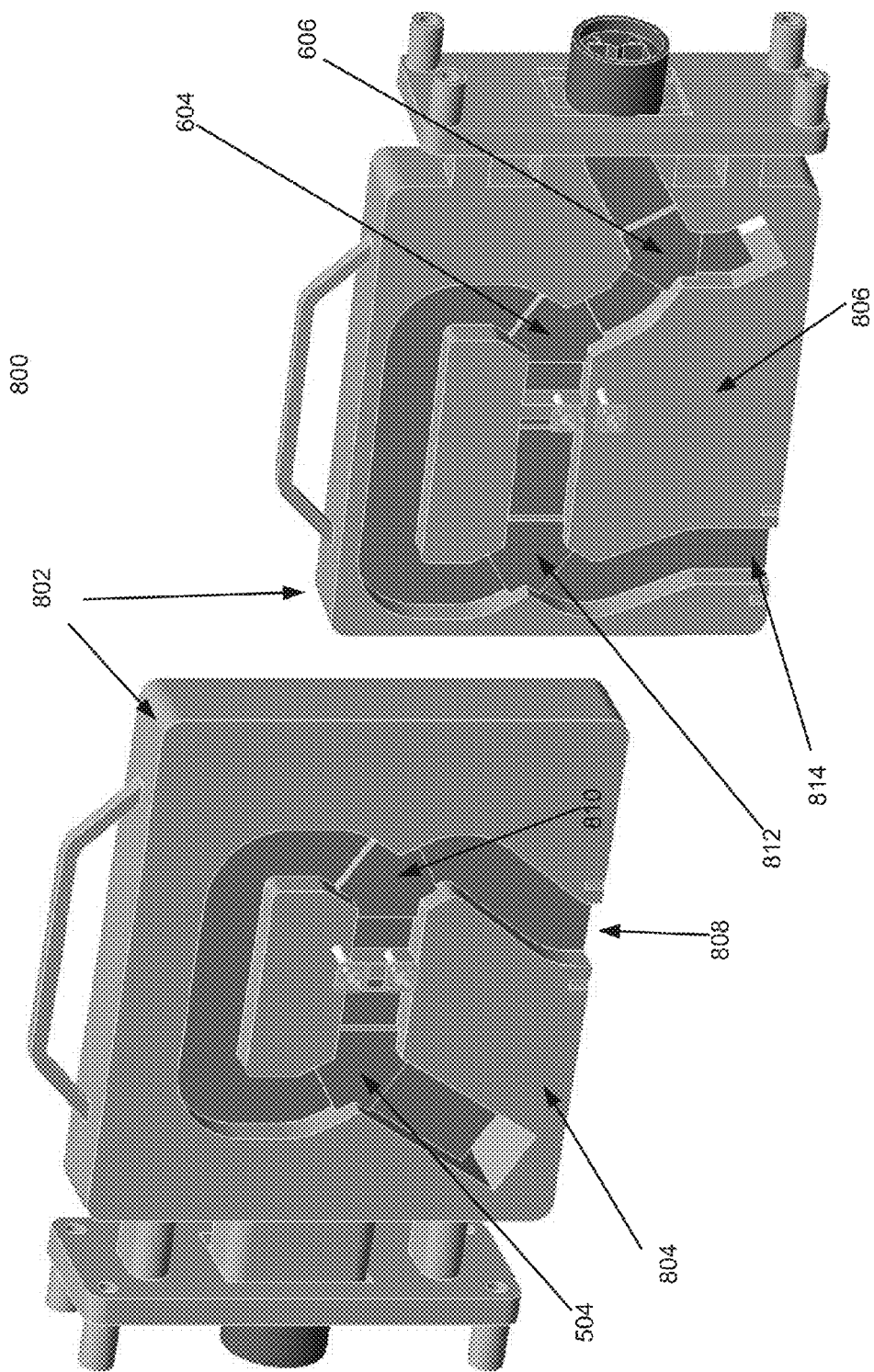
FIG. 8 is a representation of two sides of a circulator plate in an exemplary OCU to support two ODUs and comprising an RX expansion port and a TX expansion port.

FIG. 8 is a representation of two sides 804 and 806 of a circulator plate 802 in an exemplary OCU 800 to support two ODUs and comprising an RX expansion port 814 and a TX expansion port 808. First side 804 may also be referred to as the transmit circulator side 804 of circulator plate 802, as it comprises a transmit waveguide circulator 504, as on the first side 502 of circulator plate 406 in FIG. 5. This transmit circulator side 804 also comprises an additional transmit waveguide circulator 810, corresponding to circulator 704 in FIG. 7B. The second side 806 of circulator plate 802 may also be referred to as the receive circulator side 806, as it comprises a receive waveguide circulator 604, as on the second side 408 of circulator plate 406 in FIG. 6. This receive circulator side 806 also comprises an additional receive waveguide circulator 812, corresponding to circulator 706 in FIG. 7B.

Figure 9:
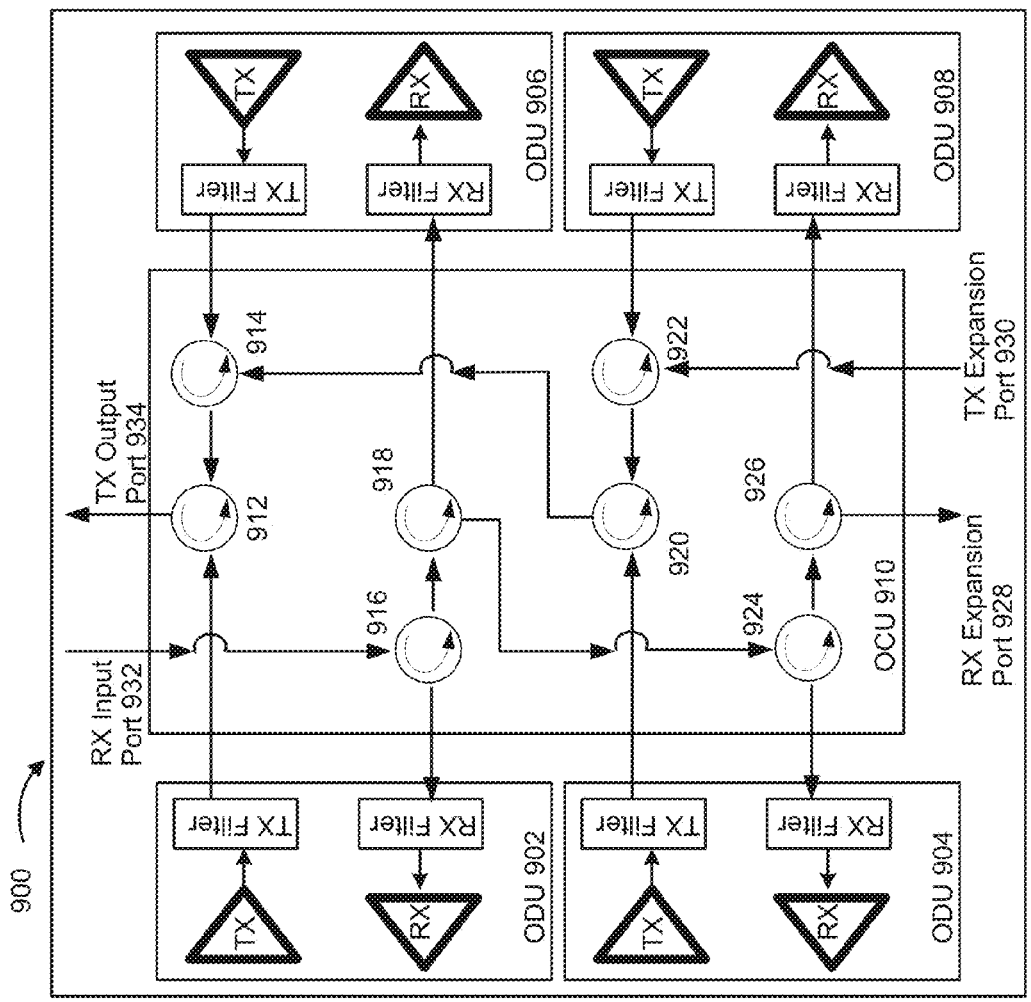
FIG. 9 is a schematic diagram of an exemplary OCU designed to support four ODUs.

FIG. 9 is a schematic diagram of an exemplary OCU 910 designed to support four ODUs such as ODU 902, 904, 906 and 908. This exemplary OCU 910 has two ports, RX input port 932 and TX output port 934 to connect with at least one antenna. When connected with an antenna, RX input port 932 and TX output port 934 can be called antenna ports, but these ports can also be used to hook up with another OCU through its expansion ports. If OCU 910 is placed in a radio communication system 900 with one antenna, an additional circulator can be added at ports 932 and 934 to act as an isolator. In some embodiments, system 900 comprises one antenna for receiving signals and one antenna for transmitting signals, in which case ports 932 and 934 can be connected with separate antennas.

OCU 910 expands on the principles disclosed earlier for the OCUs designed to support two ODUs. In system 900, OCU 910 comprises enough circulators to combine component TX signals from ODU 902, ODU 906, ODU 904, ODU 908 and potentially from TX expansion port 930. Similarly, OCU 910 comprises enough circulators to split a first RX signal into component RX signals for reception by ODU 902, ODU 904, ODU 906, ODU 908 and possibly RX expansion port 928. An additional OCU 910 with 4 attached ODUs can be added to system 900 by connecting the RX expansion port 928 of one OCU 910 with RX input port 932 of another OCU 910, and connecting the TX expansion port 930 of one OCU 910 with TX output port 930 of the other OCU 910. In some embodiments, ODUs 902, 904, 906 and 908 operate on different frequency channels, and can be swapped out for ODUs operating on different frequency channels, or switched with each other to possibly enhance the performance of system 900. In some embodiments, one or more of the ODUs may operate on the same frequency channel as another ODU in system 900, and therefore may be shut down during normal operation of OCU 910 in case of the need for future backup. In some embodiments, the two expansion ports 928 and 930 have loads placed on them so that any signals received at the ports are reflected back to circulator 926 or 922, respectively. The principles of combining TX signals in circulators 922, 920, 914 and 912 are essentially the same as those described earlier in other embodiments of the OCU. The principles of splitting RX signals in circulators 916, 918, 924 and 926 are essentially the same as those described earlier in other embodiments of the OCU.

Figure 10:
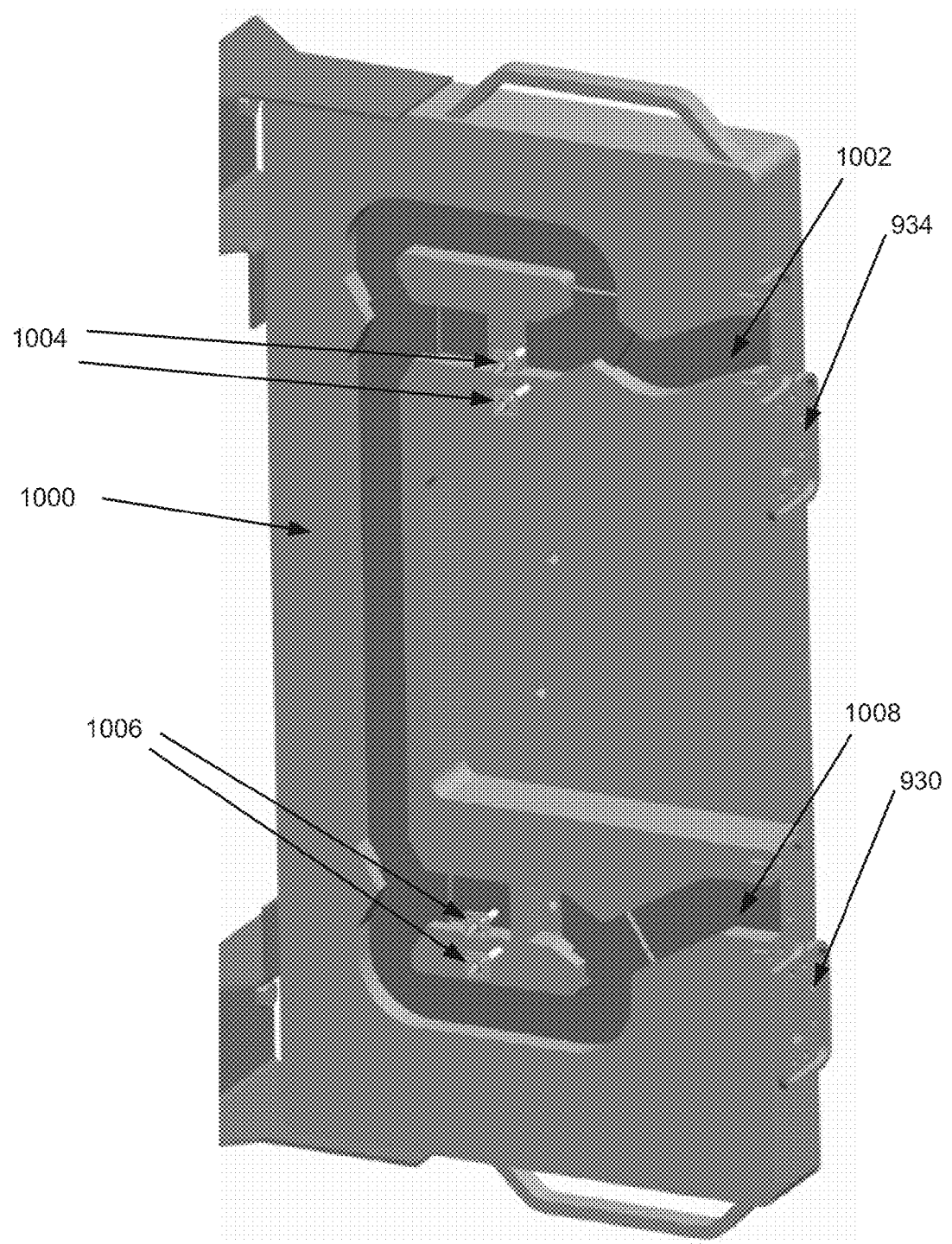
FIG. 10 is a representation of the receive circulator side of an exemplary circulator plate of an OCU, designed to support four ODUs.

FIG. 10 is a representation of the receive circulator side of an exemplary circulator plate 1000 of an OCU 910. In this embodiment, OCU 910 uses waveguides and waveguide circulators, but another signal transfer medium could be utilized with another type of circulator. Waveguide 1002 goes to RX input port 932 from FIG. 9A. Similarly, TX output port 934 has a corresponding portion of waveguide connected to it on the other side of the circulator plate. In some embodiments, ports 1004 provide the TX and RX connections to ODU 902 in FIG. 9, while ports 1006 provide the TX and RX connections to ODU 904 in FIG. 9. Waveguide 1008 is used to provide a connection between the RX expansion port 928 from FIG. 9, and one of the circulators in OCU 910. Similarly, TX expansion port 930 has a portion of waveguide on the other side of circulator plate 1000, providing a connection from TX expansion port 930 to one of the circulators in OCU 910.

Figure 11:
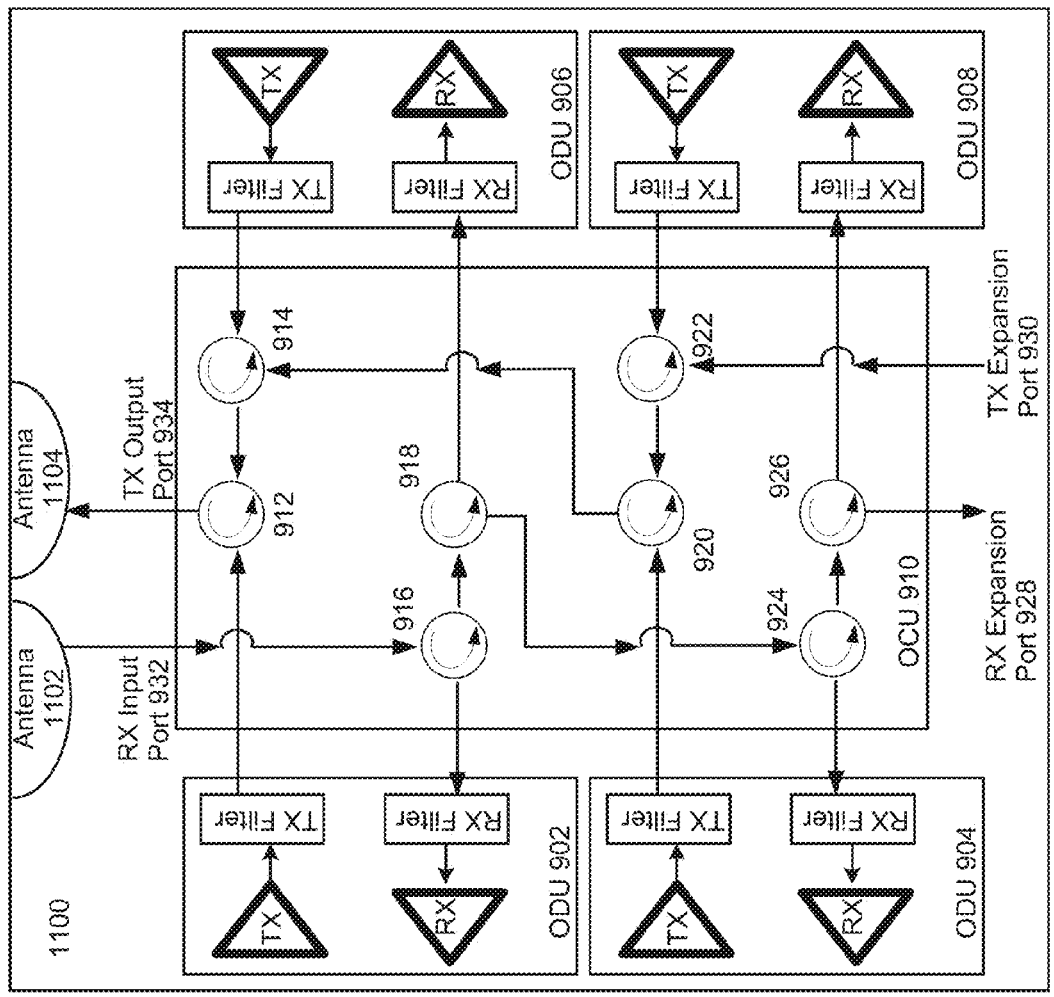
FIG. 11 is a schematic diagram of an exemplary radio communication system comprising 2 antennas, four ODUs, an OCU designed to support four ODUs and comprising expansion ports for possible expansion.

FIG. 11 is a schematic diagram of an exemplary radio communication system 1100 comprising 2 antennas 1102 and 1104, four ODUs 902, 904, 906 and 908, and an OCU 910 designed to support four ODUs and comprising expansion ports 928 and 930 for possible expansion. OCU 910 operates as shown in FIG. 9, but with a dedicated antenna 1102 for receiving signals, and a dedicated antenna 1104 for transmitting signals.

Figure 12:
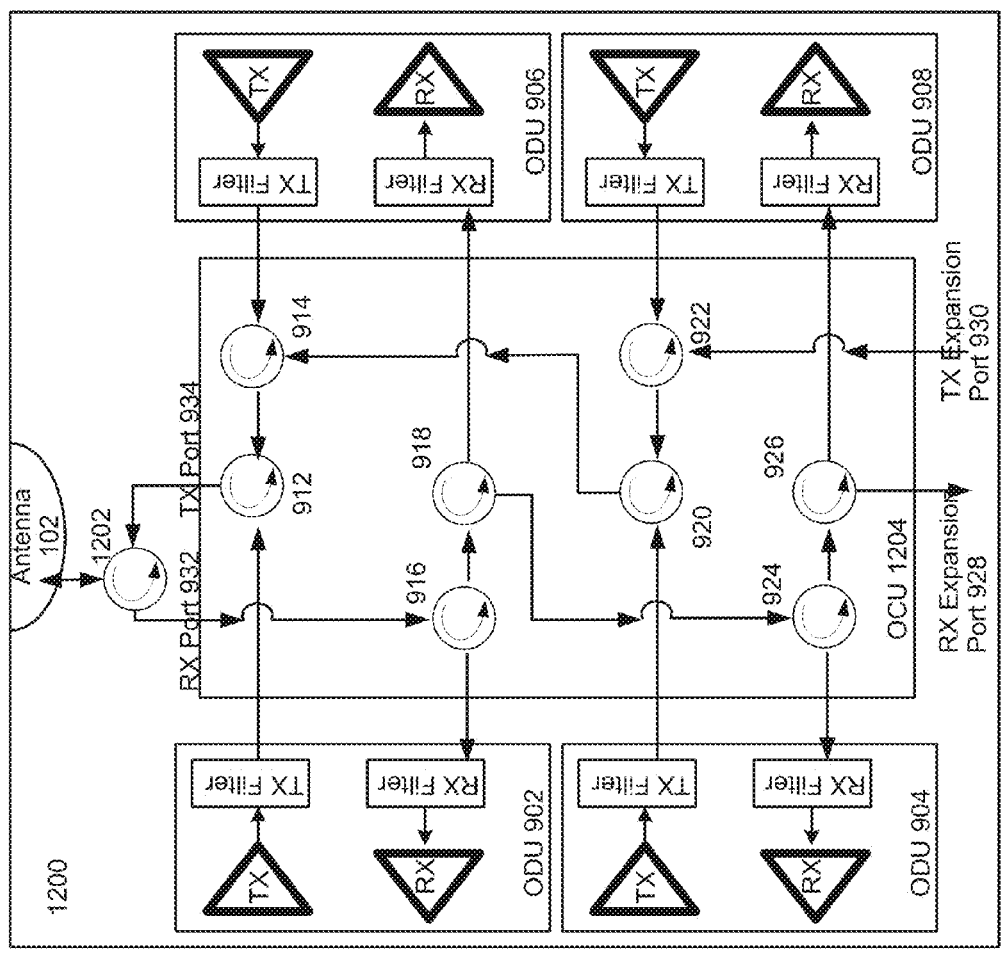
FIG. 12 is a schematic diagram of an exemplary radio communication system comprising 1 antenna, 1 external circulator, four ODUs, an OCU designed to support four ODUs and comprising expansion ports for possible expansion.

FIG. 12 is a schematic diagram of an exemplary radio communication system 1200 comprising 1 antenna 102, four ODUs 902, 904, 906 and 908, an OCU 1204 designed to support four ODUs and comprising expansion ports 928 and 930 for possible expansion. System 1200 utilizes an additional circulator 1202 to isolate the TX signals sent to antenna 102 and the RX signals received from antenna 102. In some embodiments circulator 1202 is an external circulator located outside OCU 1204, while in some embodiments OCU 1204 comprises circulator 1202 within the enclosure of the OCU. It may be advantageous to place circulator 1202 on the outside of OCU 1204 to provide a convenient transition to a 2-antenna system. If it is known that system 1200 will be always be a 1-antenna system, it may be advantageous to place circulator 1202 inside OCU 1204 to protect it from unnecessary environmental exposure.

Figure 13:
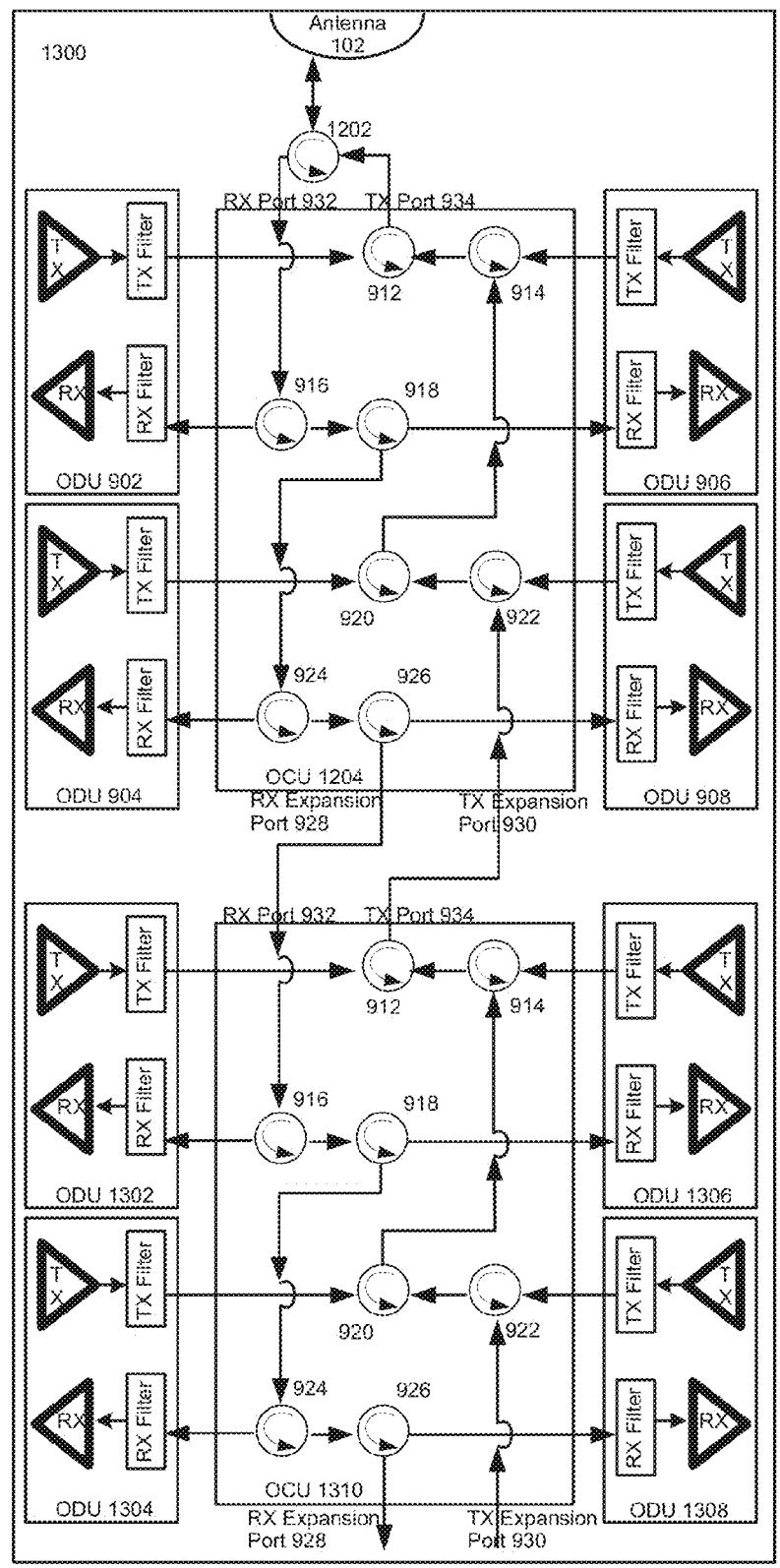
FIG. 13 is a schematic diagram of an exemplary radio communication system comprising 1 antenna, 1 external circulator, eight ODUs, and two OCUs each designed to support four ODUs and comprising expansion ports for possible expansion.

FIG. 13 is a schematic diagram of an exemplary radio communication system 1300 comprising 1 antenna 102, eight ODUs, and two OCUs 1204 and 1310 each designed to support four ODUs and comprising expansion ports 928 and 930 for possible expansion.

In system 1300, the RX expansion port 928 of OCU 1204 is connected with the RX input port 932 of OCU 1310 and the TX expansion port 930 of OCU 1204 is connected with the TX output port 934 of OCU 1310. While OCU 1204 and OCU 1310 have different labels in FIG. 13B, in some embodiments they are identical in function and composition. In some embodiments, each ODU in system 1300 is tuned to a different frequency channel to provide improved quality of service in the network. In some embodiments, one or more ODUs of system 1300 may be tuned to be a duplicate of another ODU, to act as a backup in case of failure of another ODU.

Figure 14:
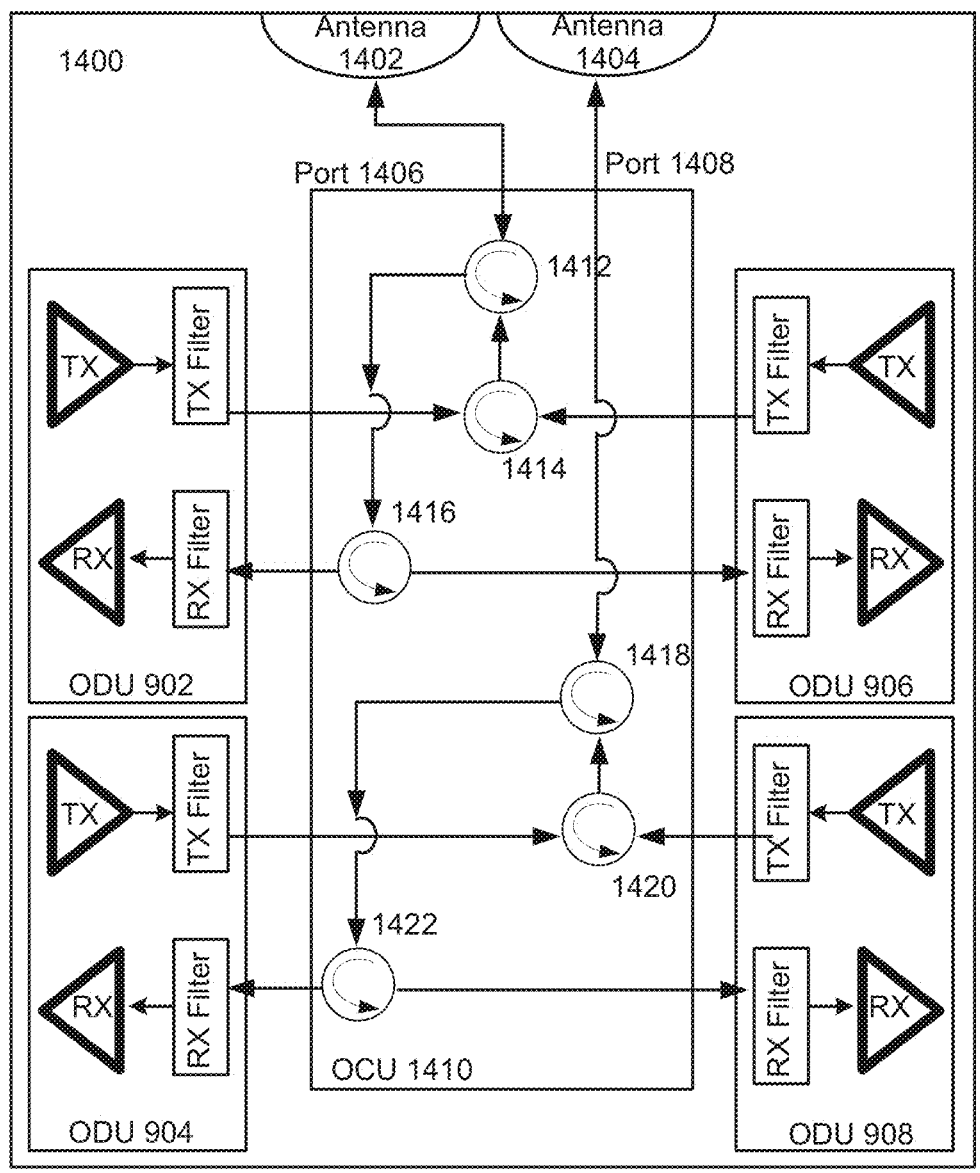
FIG. 14 is a schematic diagram of an exemplary OCU designed to support four ODUs without expansion ports, coupled with 2 antennas.

FIG. 14 is a schematic diagram of an exemplary OCU 1410 designed to support four ODUs 902, 906, 904 and 908 without expansion ports, coupled with 2 antennas 1402 and 1404. In OCU 1410, the circulators are configured so that ODU 904 and ODU 908 exclusively utilize antenna 1404, and ODU 902 and ODU 906 exclusively utilize antenna 1402. This exemplary radio communication system 1400 demonstrates the versatility of OCU design, to create systems where all the ODUs in a system utilize all the antennas of the system, or to create systems where a subset of ODUs in a system utilize a subset of the antennas of the system. For example, in some systems, one antenna may be exclusively used for receiving signals and may be electrically coupled through the use of circulators to the receiver of every ODU in the system, and the other antenna may be exclusively used for transmission and may be electrically coupled with the transmitter of every ODU in the system through the use of circulators in the OCU.

Figure 15:
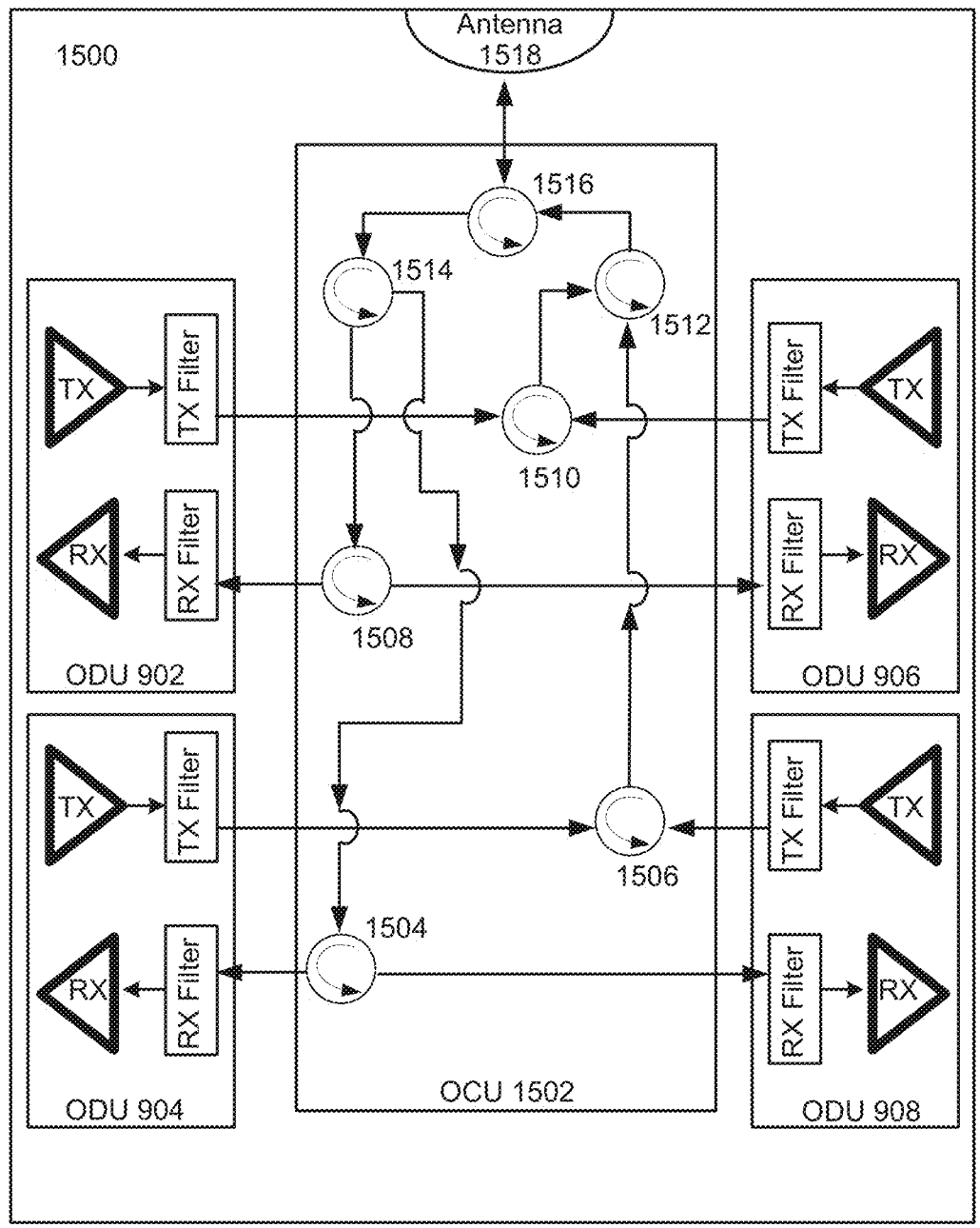
FIG. 15 is a schematic diagram of an exemplary OCU designed to support four ODUs without expansion ports, coupled to 1 antenna.

FIG. 15 is a schematic diagram of an exemplary radio communication system 1500 with OCU 1502 designed to support four ODUs 902, 904, 906 and 908 without expansion ports, coupled to 1 antenna 1518. In OCU 1502, circulators 1506, 1510 and 1512 combine and transmit an aggregated TX signal to circulator 1516 which acts as an isolator to send the aggregated TX signal to antenna 1518, and receive and send to circulator 1514 an aggregated RX signal from antenna 1518. Circulator 1514 splits the received signal into two intermediate RX signals for circulator 1508 and 1504, which further split the aggregated RX signal into component RX signals to be received by the receivers of the four ODUs. It should be noted that in FIG. 12 and FIG. 13, there was a final, external circulator to act as an isolator between TX and RX signals interfacing with the antenna. In this embodiment, the final isolating circulator is contained within the OCU.

Figure 16:
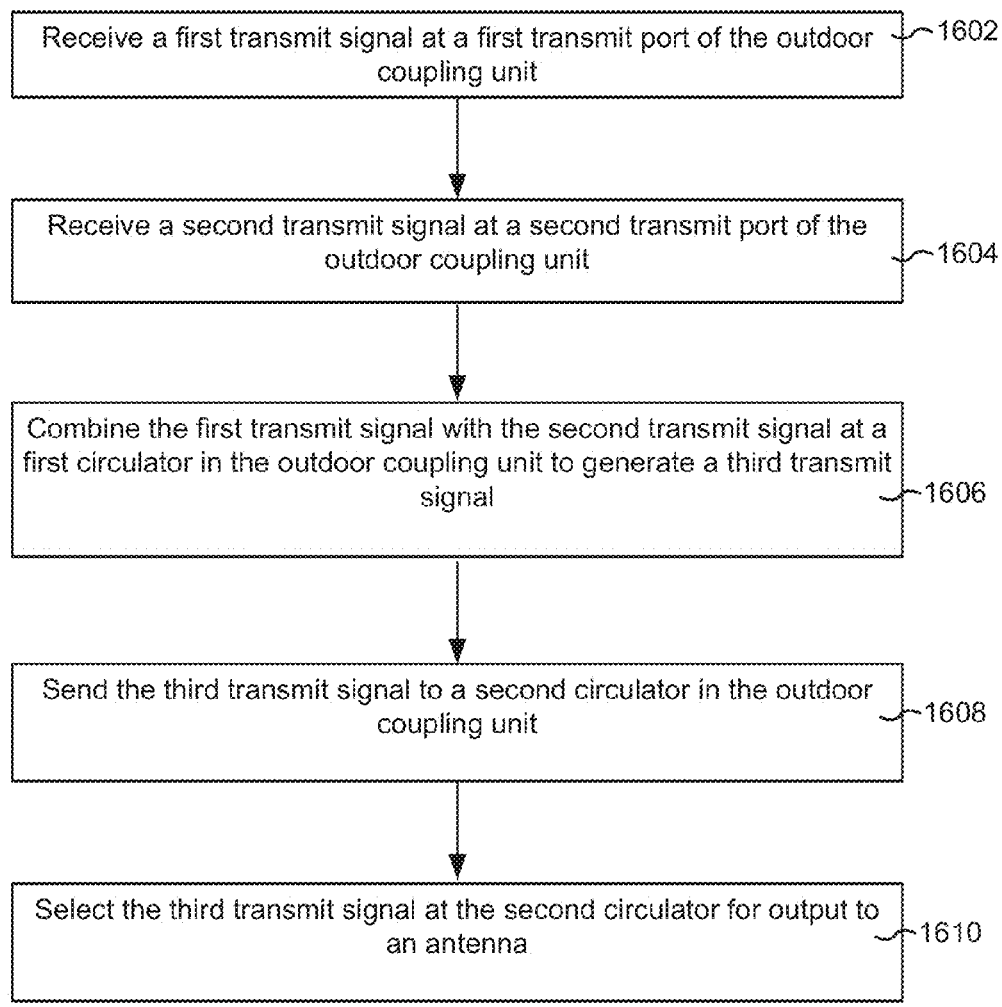
FIG. 16 is a flow diagram of a method for transmitting signals from an outdoor coupling unit.

FIG. 16 is a flow diagram of a method 1600 for transmitting signals from an outdoor coupling unit. The method is performed by (and at) an outdoor coupling unit (OCU). The OCU receives 1602 a first transmit signal at a first transmit port. In some embodiments the first transmit signal comes from a first outdoor unit (ODU) and in some embodiments the first transmit signal may come from another OCU.

The OCU receives 1604 a second transmit signal at a second transmit port. In some embodiments the second transmit signal comes from a second ODU, where the second ODU operates on a different frequency channel as the first ODU. In some embodiments the second transmit signal comes from another OCU.

The OCU combines 1606 the first transmit signal and the second transmit signal at a first circulator, to generate a third transmit signal. The first circulator effectively performs this combining of the first transmit signal and second transmit signal by receiving the first transmit signal, from the first transmit port of the OCU, at a first port of the first circulator. The first transmit signal is output through the second port of the first circulator, toward the second transmit port of the OCU. At the second transmit port of the OCU, the first transmit signal is reflected back toward the second port of the first circulator. The second transmit signal also travels to the second port of the first circulator. The first circulator sends the reflected first transmit signal and the second transmit signal through its third port, effectively combining the first transmit signal and second transmit signal.

The OCU sends 1608 the third transmit signal to a second circulator. The OCU selects 1610 the third transmit signal at the second circulator for output to an antenna. In some embodiments the second circulator can be described as an isolator, to isolate transmit and receive signals being sent to and received from an antenna. The second circulator effectively isolates the transmit and receive signals by receiving the third transmit signal on a first port of the second circulator, then sending the third transmit signal to the antenna through the second port of the circulator. The second circulator may receive from the antenna, a receive signal on its second port, but it will output the receive signal through its third port.

Figure 17:
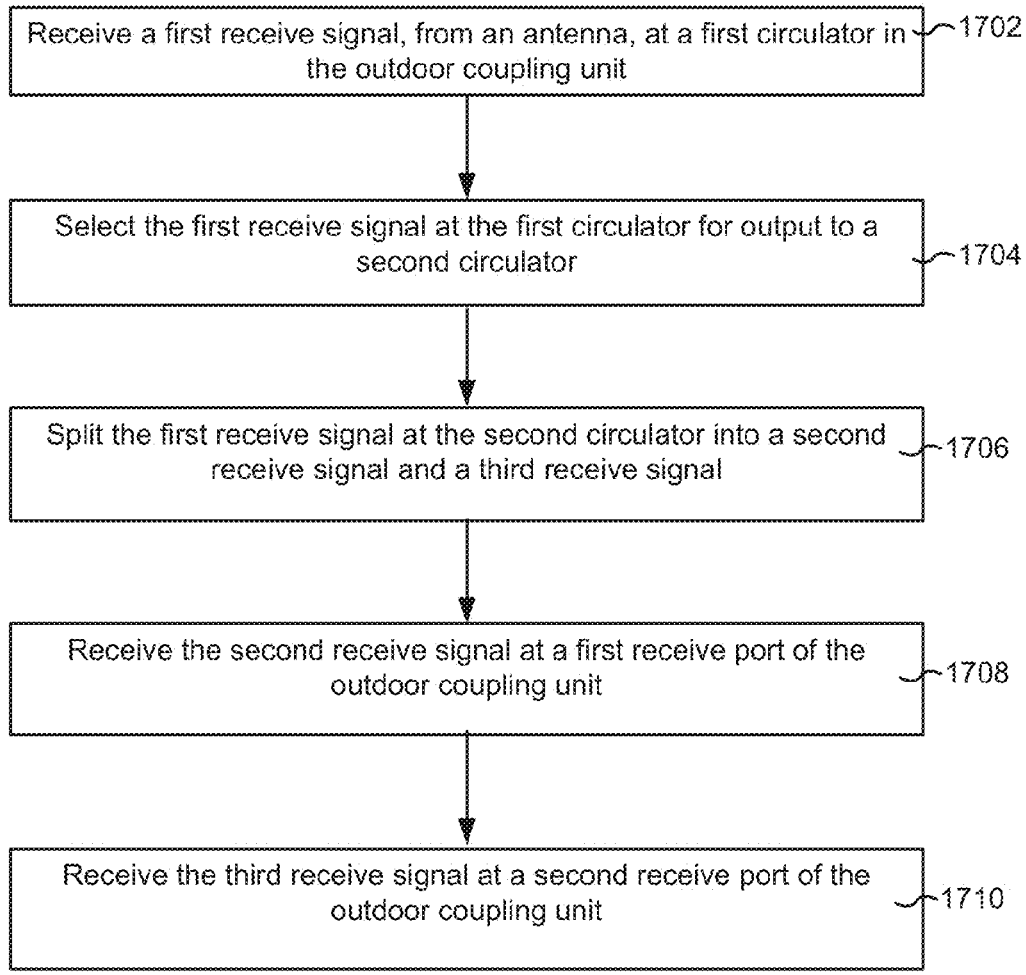
FIG. 17 is a flow diagram of a method of receiving signals in an outdoor coupling unit.

FIG. 17 is a flow diagram of a method 1700 of receiving signals in an outdoor coupling unit. The OCU receives 1702 a first receive signal, from an antenna, at a first circulator in the outdoor coupling unit. In some embodiments the first receive signal comprises component receive signals. The OCU selects 1704 the first receive signal at the first circulator for output to a second circulator. In some embodiments the first circulator can be described as an isolator, to isolate transmit and receive signals being sent to and received from an antenna. This isolating circulator works in substantially the same manner as the isolating circulator in the method for transmit, described earlier.

The OCU splits 1706 the first receive signal at the second circulator into a second receive signal and a third receive signal. The second circulator effectively performs this splitting of the signal by sending the received first receive signal (at its first port), through its second port to a first receive port of the OCU. One component (the second receive signal) of the first receive signal is received 1708 by the first receive port of the OCU. The remaining component (the third receive signal) of the first receive signal reflects off the first receive port back to the second port of the second circulator. The third receive signal is output from the third port of the second circulator. The OCU receives 1710 the third receive signal at a second receive port.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An outdoor radio communication system, comprising:
an outdoor coupler unit, the outdoor coupler unit including
a 3-port circulator network of a first circulator, a second circulator, and a third circulator;
first and second outdoor units coupled with the outdoor coupler unit, wherein each outdoor unit comprises a transmitter, a receiver, a transmit filter and a receive filter; and
an antenna coupled with the outdoor coupler unit,
wherein:
the first circulator is configured to receive a first receive signal from the antenna and transmit the first receive signal to the second circulator, the second circulator is configured to transmit a first portion of the first receive signal to the receiver of the first outdoor unit through the receive filter of the first outdoor unit, and the second circulator is configured to transmit a second portion of the first receive signal to the receiver of the second outdoor unit through the receive filter of the second outdoor unit, and
the third circulator is configured to receive a first transmit signal from the transmitter of the first outdoor unit through the transmit filter of the first outdoor unit and receive a second transmit signal from the transmitter of the second outdoor unit through the transmit filter of the second outdoor unit and transmit the first transmit signal and the second transmit signal to the first circulator, and the first circulator is configured to output the first transmit signal and the second transmit signal to the antenna.

2. The system of claim 1 wherein the antenna is coupled with the outdoor coupler unit through a waveguide.

3. The system of claim 1, wherein:
the receive filter of the first outdoor unit is configured to pass the first portion of the first receive signal matching a predefined frequency sub-band to the receiver of the first outdoor unit and reflect the second portion of the first receive signal not matching the predefined frequency sub-band to the second circulator.

4. The system of claim 3, wherein:
the receive filter of the second outdoor unit is configured to pass the second portion of the first receive signal not matching the predefined frequency sub-band to the receiver of the second outdoor unit.

5. The system of claim 3, wherein:
the second circulator has a first port, a second port, and a third port, and the second circulator is configured to receive the first receive signal from the first circulator at its first port, transmit the first portion of the first receive signal to the receiver of the first outdoor unit at its second port, and transmit the second portion of the first receive signal to the receiver of the second outdoor unit at its third port.

6. The system of claim 1, wherein the outdoor coupler unit comprises:
a first ODU-interface module comprising multiple signal communication ports;
a second ODU-interface module comprising multiple signal communication ports; and
a circulator enclosure comprising the first circulator, the second circulator, and the third circulator,
the first circulator being coupled to the second circulator and the third circulator, respectively, via wave-transfer media,
the second circulator being coupled to the receive filter of the first outdoor unit via a signal communication port of the first ODU-interface module and the receive filter of the second outdoor unit via a signal communication port of the second ODU-interface module, respectively, and
the third circulator being coupled to the transmit filter of the first outdoor unit via a signal communication port of the first ODU-interface module and the transmit filter of the second outdoor unit via a signal communication port of the first ODU-interface module , respectively.

7. The system of claim 6, wherein the circulators of the circulator enclosure are waveguide circulators, and the wave-transfer media for coupling the first circulator to the second circulator and the third circulator are waveguides.

8. The system of claim 7, wherein at least one magnet is placed on a first side of the circulator enclosure and at least one magnet is placed on a second side of the circulator enclosure, such that the magnets are positioned to align with the waveguide circulators.

9. The system of claim 6, wherein the circulators of the circulator enclosure are coaxial circulators, and the wave-transfer media for coupling the first circulator to the second circulator and the third circulator are coaxial cables.

10. The system of claim 6, wherein the circulators of the circulator enclosure are a combination of waveguide circulators and coaxial circulators, and the wave-transfer media for coupling the first circulator to the second circulator and the third circulator are a combination of waveguides and coaxial cables.

11. The system of claim 6, wherein:
the signal communication ports of the first ODU-interface module comprise a first transmit port and a first receive port;
the signal communication ports of the second ODU-interface module further comprise a second transmit port and a second receive port; and
the third circulator combines transmit signals from the first transmit port and the second transmit port, the second circulator splits the first receive signal into the first portion and the second portion and sends the firs portion and the second portion of the received signal to the first receive port and the second receive port, respectively, and the first circulator is communicatively coupled with the third circulator and the second circulator to direct the transmit signals to and the receive signal from the antenna through an antenna port.

12. The system of claim 6, wherein the outdoor coupler unit further comprises a first receiver expansion port and a first transmit expansion port.

* * * * *